United States Patent [19]

Jennings et al.

[11] 4,307,674
[45] Dec. 29, 1981

[54] AGRICULTURAL IMPLEMENT FOR PLANTING SEEDS

[75] Inventors: Marvin D. Jennings, Hendersonville, N.C.; Keith W. Wendte, Lemont, Ill.

[73] Assignee: International Harvester Company, Chicago, Ill.

[21] Appl. No.: 172,609

[22] Filed: Jul. 28, 1980

Related U.S. Application Data

[63] Continuation of Ser. No. 1,973, Jan. 8, 1979, abandoned.

[51] Int. Cl.³ .................................................. A01C 5/06
[52] U.S. Cl. ........................................... 111/85; 111/88
[58] Field of Search .................... 111/24, 64, 85, 87, 111/52, 62, 63, 88; 172/170, 172, 184, 417, 538, 539

[56] References Cited

U.S. PATENT DOCUMENTS

| | | | |
|---|---|---|---|
| 526,436 | 9/1894 | Campbell | 111/24 |
| 530,962 | 12/1894 | Packham | 111/85 |
| 601,342 | 3/1898 | Hunt et al. | 172/538 X |
| 1,057,141 | 3/1913 | Garst | 172/538 |
| 1,843,110 | 2/1932 | Cooper | 172/539 |
| 1,902,924 | 3/1933 | Wamhoff et al. | 111/63 |
| 2,577,775 | 12/1951 | Lemmon et al. | 111/87 |
| 2,732,975 | 1/1956 | Balzer | 111/85 |
| 3,060,873 | 10/1962 | Powers | 111/63 X |
| 3,335,681 | 8/1967 | Main et al. | 111/64 |
| 3,499,495 | 3/1970 | Pust | 111/87 X |
| 3,626,877 | 12/1971 | Hansen et al. | 111/85 |
| 4,009,668 | 3/1977 | Brass et al. | 111/85 |
| 4,141,302 | 2/1979 | Morrison et al. | 111/85 X |

FOREIGN PATENT DOCUMENTS 657433 4/1965 Belgium ................................. 111/85

*Primary Examiner*—James R. Feyrer
*Attorney, Agent, or Firm*—James J. Gitchius; Neal C. Johnson; F. David AuBuchon

[57] ABSTRACT

An implement that includes a pair of furrow forming disks, a seed tube located between the disks for depositing seed in the furrow, a seed firming wheel rotatably supported between the disks for movement in the furrow generally adjacent the tube exit and a pair of pivotally mounted furrow closing and gauge wheels located generally adjacent the seed firming wheel. The elements of the implement are particularly constructed and arranged primarily to achieve accurate seed depth control.

6 Claims, 8 Drawing Figures

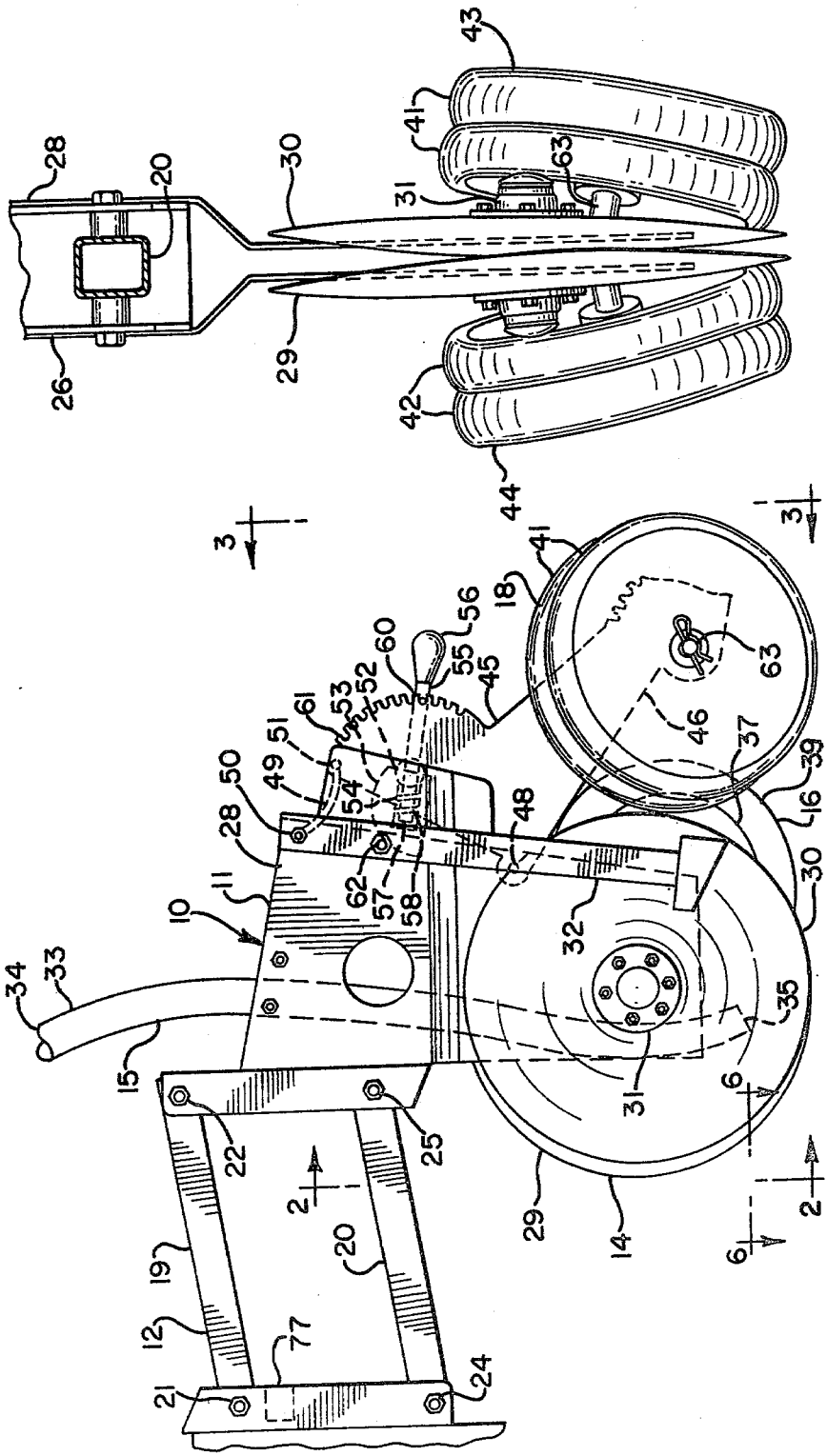

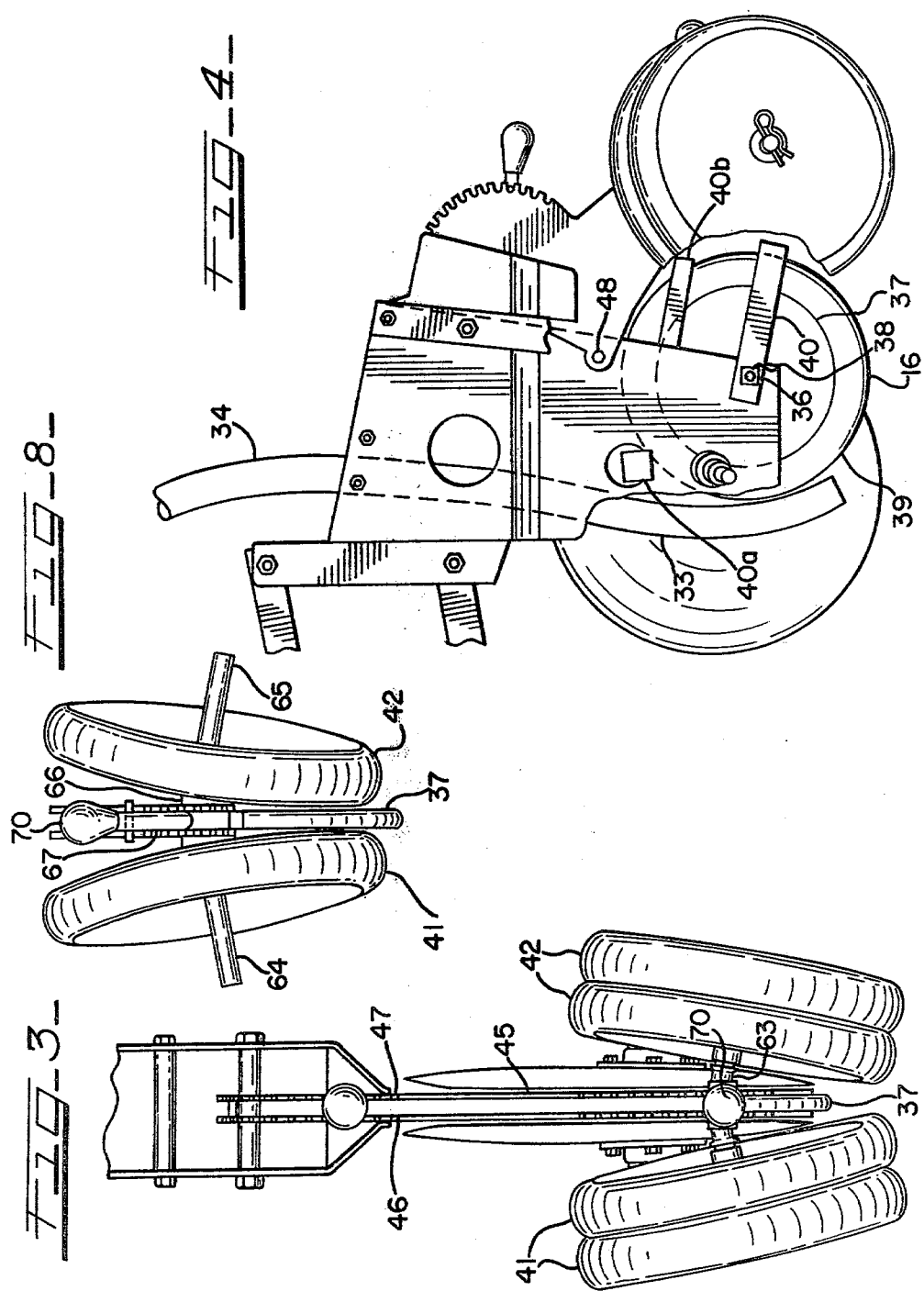

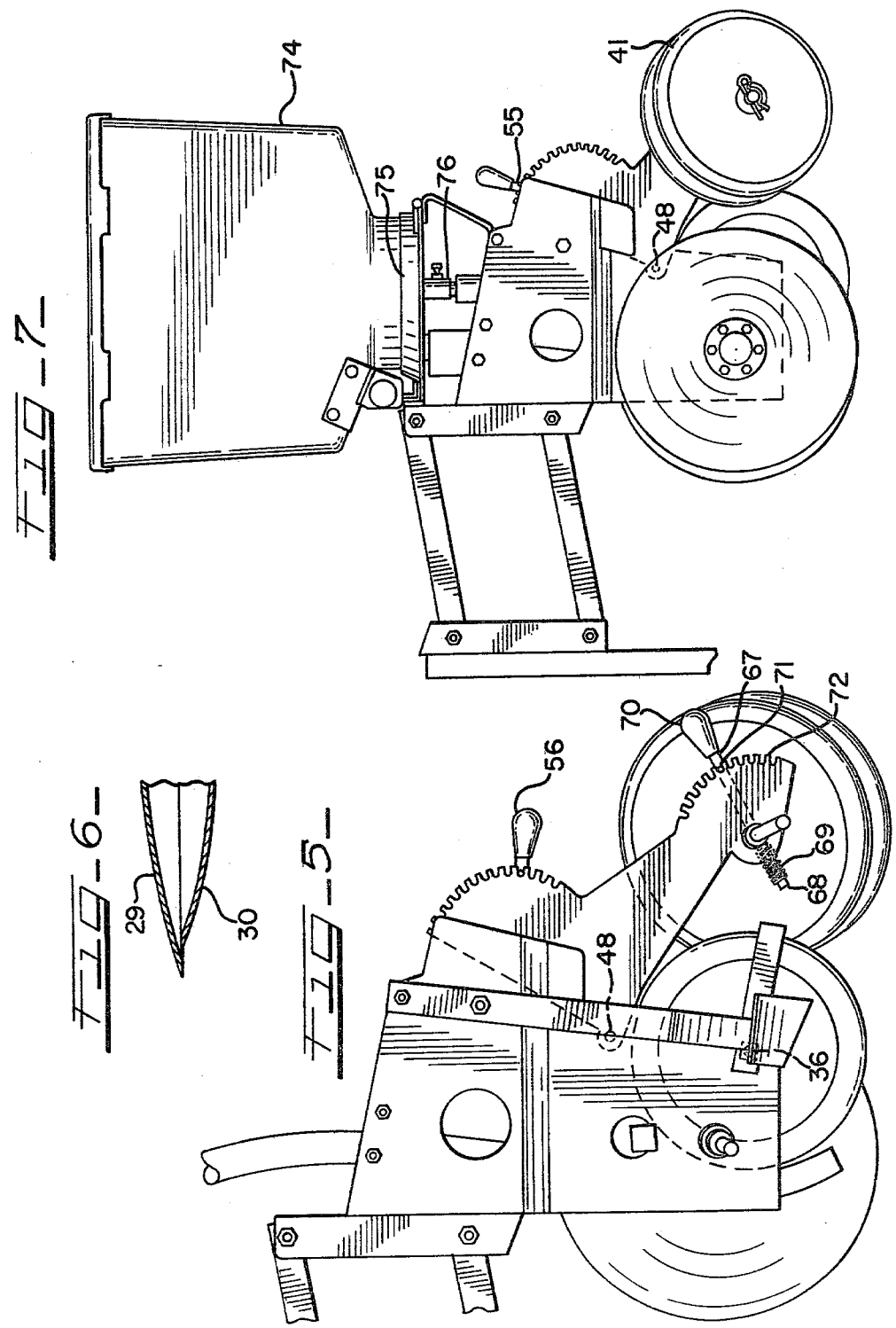

AGRICULTURAL IMPLEMENT FOR PLANTING SEEDS

This is a continuation of application Ser. No. 1,973, filed Jan. 8, 1979, now abandoned.

BACKGROUND OF THE INVENTION

1. Field of the Invention

This invention pertains generally to agricultural planting equipment.

2. Description of the Prior Art

The efficient production of crops requires that planters meet certain primary design objectives which are: accurate planting depth, seed and soil contact, and accurate seed spacing. If the seed is planted too deep, the plant may not emerge. If planted too shallow, there may not be enough moisture for germination. Good seed and soil contact is needed for germination but same must be provided without undue soil crusting to inhibit plant emergence. Accurate spacing of seed is necessary to provide equal access to sun, water and nutrients and for uniform stands.

Most planters attempt to meet the noted objectives but with varying success. For example, a conventional and fairly popular planter which is connected to a tool bar by upper and lower parallel links for vertical parallel movement as the planter follows the ground surface, places the adjustable (pivotally mounted) gauge wheels, which also support the planter, close to the disks ostensibly for accurate furrow depth control. Yet rearwardly (pivotally) mounted spring loaded (adjustable) furrow closing wheels are also utilized. Inasmuch as the planter is also supported thereon, gauging is really done at both locations, so accurate furrow depth is not achieved. In addition, the disk openers do not carve out perfect V-shaped trenches or furrows, but instead leave some soil therein. The seed placed in the furrow therefore is not necessarily at the maximum depth of the trench but may be on the soil therein and thus is not located at a desired depth. Also seed bounce in the furrow is common with today's planting speeds even with conventional plate type (gravity drop) dispensers. This affects seed spacing and depth as the seed may be covered by the soil before it comes to rest. Inasmuch as the seed depth varies, the furrow closing (or pinch) wheels may also not provide the soil contact desired therewith when the seed is not at the desired depth. Also the undesirable soil compacted by the gauge wheels is utilized to fill the furrow. Thus the noted planter objectives are not successfully met.

SUMMARY OF THE INVENTION

Applicants, as a consequence, designed an implement for planting seeds that largely avoids the disadvantages of the prior art. Generally, applicants devised a compact, narrow, and light weight implement. Hence the disk spaced gauge wheels of the prior art were eliminated thereby largely achieving the desired configuration for narrow rows useful when a plurality of implements are mounted in side by side relationship on a tool bar. Upper and lower parallel links for connection to a tool bar are provided as in the past, but the support frame is modified to achieve the desired configuration. Further, it was decided to design the implement for use with planters having centralized seed hoppers and air operated seed dispensers and delivery systems in addition to conventional hopper-plate type planters. The air type planter may be similar to that shown in U.S. Pat. No. 3,848,552 issued Nov. 19, 1974 to J. Bauman et al and assigned to subject assignee. The problem of seed bounce is greatly accentuated with air type planters. Applicants specifically utilize a pair of rotatably mounted, furrow forming concave disks that substantially contact each other at the point of entry into the ground and diverge apart rearwardly and upwardly to form the furrow. Preferably the disks have concave surfaces that face each other to avoid the problem of the soil continuing to move outwardly, thereby forming unduly wide furrow walls above the ground. Also, preferably the disks are staggered, that is the periphery of one disk contacts the concave surface of the other. A larger amount of loose, moist soil with this construction is left in the furrow which is also more in the shape of a "W" than a partially, soil filled "V." The seed tube is mounted between the disks with an end extending into the furrow generally adjacent midway where the disks enter and leave the ground and the other end may be connected to a tube extending to the air dispensing system or to a plate dispenser. Directly behind the end of the tube in the furrow (between the disks), applicants rotatably mount a seed firming wheel which presses and encapsulates the seed emerging from the tube into the "W" shaped moist soil in the furrow to prevent same from bouncing. Preferably the firming wheel has a resilient rim to prevent soil buildup and is loosely mounted on its axis of rotation for a wobble motion in the direction of travel. Scrapers may also be utilized. For the necessary gauging of the disk depths, applicants utilize a pair of pivotally supported and rotatably mounted furrow closing and gauging wheels that straddle and preferably overlap longitudinally the firming wheel. The closing wheels are located in diverging planes straddling the furrow and the angle can be changed to vary the amount of the loose soil covering the seed. Further, the closing wheels are pivotally supported on the implement and via a cam, lever and ratchet arrangement, the height of the support frame relative to the ground can be changed. Inasmuch as the disks and firming wheel are positively located on the frame, gauging is only accomplished by the pivotally mounted closing wheels. And because of the compact arrangement of the disks, firming wheel and closing wheels, the disks cut an accurate depth trench and the firming wheel places the seed at the related proper depth in the soil in the furrow. Seed bounce and improper spacing are eliminated and proper seed and soil contact in the moist soil is attained in a compact and simplified implement. Where an air delivery system is not utilized, a seed hopper and a dispensing apparatus (which may be hydraulically or mechanically driven) may be utilized.

It is, therefore, an object of this invention to provide a new and improved implement for planting seeds.

Another object is to provide a compact implement that also utilizes less structure.

BRIEF DESCRIPTION OF THE DRAWINGS

FIG. 1 is a side elevation view of the implement of this invention;

FIG. 2 is an enlarged view taken along line 2—2 of FIG. 1;

FIG. 3 is an enlarged view of the implement taken along line 3—3;

FIG. 4 is a view similar to FIG. 1 but with the front disk removed;

FIG. 5 is a view similar to FIG. 1 but with also the front gauging wheel removed;

FIG. 6 is a view taken along 6—6 of FIG. 1;

FIG. 7 is a somewhat schematic reduced scale view, similar to FIG. 1, but showing the implement incorporated into plate type planter and with the disks located for maximum penetration; and FIG. 8 is a partial rear view showing the gauge wheels adjusted for greater soil coverage.

DESCRIPTION OF THE PREFERRED EMBODIMENT

Referring to FIGS. 1-3, 10 indicates an agricultural implement for planting seeds. Implement 10 has a frame 11. Implement 10 also includes a mounting means 12 for attachment to a mobile power source such as a tractor or a tool bar; a furrow forming means 14, a seed dispensing means 15, a seed firming means 16, and a combination gauging and furrow closing means 18.

Mounting means 12 includes upper and lower parallel links 19 and 20. Link 19 has pivot 21 at its forward end for pivotal connection to a tractor or tool bar by fasteners and is pivotally connected at its rearward end at 22 via suitable fasteners to frame 11. Lower link 20 likewise has pivot 24 at its forward end for pivotal connection to a tractor or tool bar and is pivotally connected at its rearward end at 25 via suitable fasteners to frame 11. The parallel link arrangement mounts the implement for vertical parallel movement thereby allowing the implement to follow the contour of the ground in operation.

Frame 11 is a steel weldment comprised of spaced formed plates 26 and 28 (See FIG. 2) with reinforcing elements therebetween. Plates 26 and 28 have lower portions depending therefrom for the support of furrow forming means 14.

Furrow forming means 14 includes preferably a pair of disks 29 and 30. Each disk preferably has a concave configuration with the concave sides of each disk facing each other in the mounted position as shown best in FIG. 2. Disk 29 and disk 30 are rotatably supported on frame plates 26 and 28 respectively having lower portions (which extend between the disks) by flange type bearings 31 located on the convex sides of the disks for accessibility. Preferably the disks are mounted in staggered (see FIGS. 1 and 6) fashion so that the periphery of disk 29 extends beyond that of disk 30 whose periphery therefore substantially contacts the concave side of disk 29. The disks are also mounted on non-parallel axes so that they substantially contact each other at the point of entry into the ground and diverge apart upwardly and rearwardly. A scraper 32 may be utilized to scrape disk 30 with similar means provided for disk 29.

Seed dispensing means 15 of implement 10 is essentially a tube 33 (see FIG. 4) which is adapted to be connected at its upper end 34 to a seed delivery tube of an air type planter or to the dispenser of a typical plate type planter (see FIG. 7). Tube 33 is supported between plates 26 and 28 of frame 11 and therefore between the disks 29 and 30 and extends downwardly to its lower end 35 located approximately midway where the disks enter and leave the ground.

Immediately rearward of the lower end 35 of tube 33 is seed firming means 16 as shown best in FIG. 4. Means 16 is essentially a shaft 36 supported wheel 37 mounted for rotation on the lower portions of plates 26 and 28 of frame 11 in bearing 38 located therebetween and in alignment with tube 33 and the center of the furrow. Preferably wheel 37 has a resilient rim 39 to prevent soil build-up and is somewhat loosely mounted on its axis of rotation at shaft 36 for a wobble motion in the direction of travel to aid in the removal of soil. Scrapers 40, 40a, and 40b may be utilized with wheel 37. Inasmuch as wheel 37 and disks 29 and 30 are positively located on frame 11, with no adjustment provisions, they remain in a constant physical relation to each other. Hence as disks 29 and 30 are raised or lowered into the ground, wheel 37 is similarly affected. Thus, whether the seed is deposited in a shallow or a deep furrow, the seed firming wheel will position the seed in the same relation to the disks so that the seed is accurately placed. While the loose soil left in the furrow may vary slightly depending on furrow depth, the firming wheel will compress same more or less to keep the same seed depth in relation to the disk setting.

As shown best in FIGS. 1, 2, 5 and 7 combination gauging and furrow closing means 18 includes wheels 41 and 42 having resilient rims 43 and 44 respectively. While a pair of each for contacting opposite sides of the furrow are shown, one wheel for each side of the furrow could be utilized. Two, however, per furrow side, are preferred as they better fracture therebetween the covering soil for an improved seed bed due to the alternating and independent rim flexing which also cleans the rim surfaces. The relative rotation between wheels is also useful.

As shown best in FIG. 1, (see also FIG. 3) an important part of means 18 is the structure 45 for supporting wheels 41 and 42 on frame 11 to provide the gauging function. Specifically structure 45 includes a pair of spaced arms 46 and 47 having suitable reinforcements. Structure 45 is pivotally attached to the lower portions of plates 26 and 28 by shaft 48. A trailing wheel type mounting is desired, so chain 49 connected to pin 50 on frame 11 and a pin 51 extending between arms 46 and 47 is provided to prevent structure 45 from moving unduly low when the tool bar is raised. Yet, the trailing mounting, allows the wheels to remain in contact with the soil even when the disks encounter hard soil which tends to lift the frame from the ground. Structure 45 includes adjustment structure to vary the height of frame 11 by movement about shaft 48. Specifically, shaft 52 is rotatably mounted between arms 46 and 47 and has cam 53 having slot 54 welded thereto and extending between the noted arms. Via a suitable hole in shaft 52, handle 55 having knob 56 has one end 57 extending therethrough and into the slot 54. A spring 58 surrounding end 57 between a pin in end 57 biases the handle toward the end of the slot. The other end has a fixed pin 60 adjacent the knob 56 and adapted to engage a series of aligned slots 61 in arms 46 and 47 to provide the desired adjustment. A cam follower 62 mounted between plates 26 and 28 is provided for contact by cam 53. Thus, movement of handle 55 against spring 57 frees fixed pin 60 from the slots, thus permitting rotation of handle 55 and thus cam 53 to essentially to vary the length of structure 45 that contacts follower 62 of frame 11. The adjustment structure shown can provide a maximum disk depth of about three inches as depicted in FIG. 7 when the gauge wheels are located in their raised position relative to the frame 11. FIG. 1 shows the disks in an intermediate position.

Referring to FIGS. 1, 3, 5, and 8, wheels 41 and 42 are mounted on structure 45 by shaft 63. Shaft 63 has ends 64 and 65 inclined preferably at 8° from the horizontal to provide the variable wheel positions shown in FIGS. 3 and 8. Shaft 63 also has a slot in its central portion 66 for handle 67 extending therethrough. One end of handle 67 has a pin 68 for spring 69 that extends between pin 68 and the shaft central portion. Handle 67 having knob 70 also has a pin 71 adjacent at its other end that is adapted to engage slots 72 in structure 45. Thus the closing adjustment of wheels 41 and 42 is similar to the gauging adjustment. FIG. 3 discloses the wheels in their standard furrow closing position. When the handle, is raised, as shown in FIG. 8, the wheels are moved outwardly to increase the soil available for closing the furrow.

Referring to FIG. 7, implement 10 may include a seed hopper 74 mounted on frame 11 where an air delivery system is not desired. Hopper 74 has plate 75 located in the bottom thereof which is driven by element 76 which may be a hydraulic motor adapted to be connected to a hydraulic system of the power source or to a suitable mechanical drive connected to the gauging wheels 41 and 42 or to a central planter drive. Suitable insecticide and fertilizer attachments could also be connected to frame 11.

In operation, if the handle 55 is in the position shown in FIG. 7, with the disks set for maximum penetration, the implement 10 is raised via the tool bar with a down stop 77 shown in dotted lines in FIG. 1 adjacent upper link 19 limiting its downward travel. The gauge wheels then descend to the lower level permitted by chain 49. If handle 55 via knob 56 is pulled outwardly against spring 58 until pin 60 is released from the slot and the handle is rotated downwardly to a selected position such as in FIG. 1 and released pin 60 again engages a slot. Cam 53 is also rotated by this action to the position shown in FIG. 1. Upon lowering the tool bar, the implement moves downwardly until the gauge wheels contact the ground and then pivot upwardly about shaft 48 until cam 53 engages cam follower 62 preventing further movement of the gauge wheels. The disks are then in the related position shown in FIG. 1. While it is preferred to lift the tool bar to remove the load on the cam when adjusting disk depth from that shown in FIG. 7 to FIG. 1, movement of the gauge wheels in a contrary or downward direction can be easily achieved without this action as the implement will move downwardly as the follower continues to follow the cam. As mentioned, the disk depth is thus accurately controlled along with the planting depth as the firming wheel remains in a fixed relation to the disks. Further, as noted in a comparison of FIGS. 1 and 7, the gauging wheels remain adjacent to the firming wheels, even straddling same, thereby gauging as close to the disks as possible while also providing the furrow closing function.

As the power source moves the implement along the ground, parallel links 19 and 20 will cause the implement to move vertically up and down to follow the contour of the ground. Seed emerging from the lower end 35 of the seed tube will be pressed and encapsulated by the wheel 37 into the moist ground left in the furrow by the staggered disks and without bounce. Movement of handle 67 from the position of FIG. 3 to the FIG. 8 will vary the soil cover as desired for the furrow. Since wheels 41 and 42 also perform the gauging function, no gauge wheel compressed soil is moved into the furrow as in the past.

What is claimed is:

1. An agricultural implement for planting seeds comprising:
    (a) hollow frame having open ends, said frame being adapted to be connected to a mobile power source for towing;
    (b) a pair of opposed, furrow-forming disks rotatably mounted on non-parallel axes on said frame with each disk being located adjacent an opposing respective outside surface of said frame with the disks substantially contacting each other at the approximate point of entry into the ground and diverging apart rearwardly and upwardly relative to the direction of travel;
    (c) a seed tube mounted in said frame, one end of said tube extending between said disks toward the furrow and the other end being adapted for connection to a seed dispenser;
    (d) a seed firming wheel rotatably mounted in said frame between said disks, the forward periphery of said wheel being adjacent the rotatable mounting of said disks and said wheel being located rearward and adjacent said one end of said seed tube;
    (e) a combination furrow closing and gauge wheel means, said means including an arm structure pivotally mounted in said frame above said firming wheel and a pair of rotatably mounted furrow closing and gauge wheels, with each wheel being mounted on an opposing respective outside surface of said arm structure and being located laterally outwardly said firming wheel, said wheels being located in upwardly diverging planes straddling the furrow; and
    (f) adjustment means located above said firming wheel and said arm structure pivot and extending between said frame and arm structure for varying the depth of the furrow created by said disks, said means including a cam rotatably mounted in said arm structure, a cam follower mounted in said frame and means for moving said cam to selected positions and latching same, said furrow closing and gauge wheels straddling and overlapping longitudinally said firming wheel through the range of cam follower and cam contact.

2. The implement of claim 1 in which the disks are concave with the concave surfaces facing each other.

3. The implement of claim 2 in which the periphery of one disk substantially contacts the concave surface of the other disk.

4. The implement of claim 1 in which said seed firming wheel has a resilient periphery and is loosely mounted on its axis of rotation for a wobble motion in the direction of travel.

5. The implement of claim 4 in which said furrow closing and gauge wheels are mounted on a non-straight shaft which is rotatable on said frame and further comprising adjustment means to vary the inclination of the wheels to each other to control the amount of soil utilized for furrow closing.

6. An agricultural implement for planting seeds comprising
    (a) a hollow frame having open ends, said frame being adapted to be connected to a mobile power source for towing;
    (b) a pair of opposed, furrow-forming disks rotatably mounted on non-parallel axes on said frame with each disk being located adjacent an opposing respective outside surface of said frame with the disks substantially contacting each other at the approximate point of entry into the ground and diverging apart rearwardly and upwardly relative to the direction of travel;

(c) a seed tube mounted in said frame, one end of said tube extending between said disks toward the furrow and the other end being adapted for connection to a seed dispenser;

(d) a seed firming wheel rotatably mounted in said frame between said disks, the forward periphery of said wheel being adjacent the rotatable mounting of said disks and said wheel being located rearward and adjacent said one end of said seed tube, said seed firming wheel having a resilient periphery and being loosely mounted on its axis of rotation for a wobble motion in the direction of travel;

(e) a combination furrow closing and gauge wheel means, said means including an arm structure pivotally mounted in said frame above said firming wheel, a pair of furrow closing and gauge wheels having resilient rims for each side of the furrow, each pair of wheels being rotatably mounted on an opposing respective outside surface of said arm structure and being located laterally outwardly said firming wheel and in upwardly diverging planes and mounted on a non-straight shaft which is rotatable on said frame and further comprising adjustment means to vary the inclination of the pairs of wheels to each other to control the amount of soil utilized for furrow closing; and (f) adjustment means located above said firming wheel and said arm structure pivot and extending between said frame and arm structure for varying the depth of the furrow created by said disks, said means including a cam rotatably mounted in said arm structure, a cam follower mounted in said frame and means for moving said cam to selected positions and latching same, said furrow closing and gauge wheels straddling and overlapping longitudinally said firming wheel through the range of cam follower and cam contact.

* * * * *